Nov. 22, 1949  S. MAYNER ET AL  2,488,676
TRACTOR HITCH
Filed Dec. 10, 1943  4 Sheets-Sheet 1
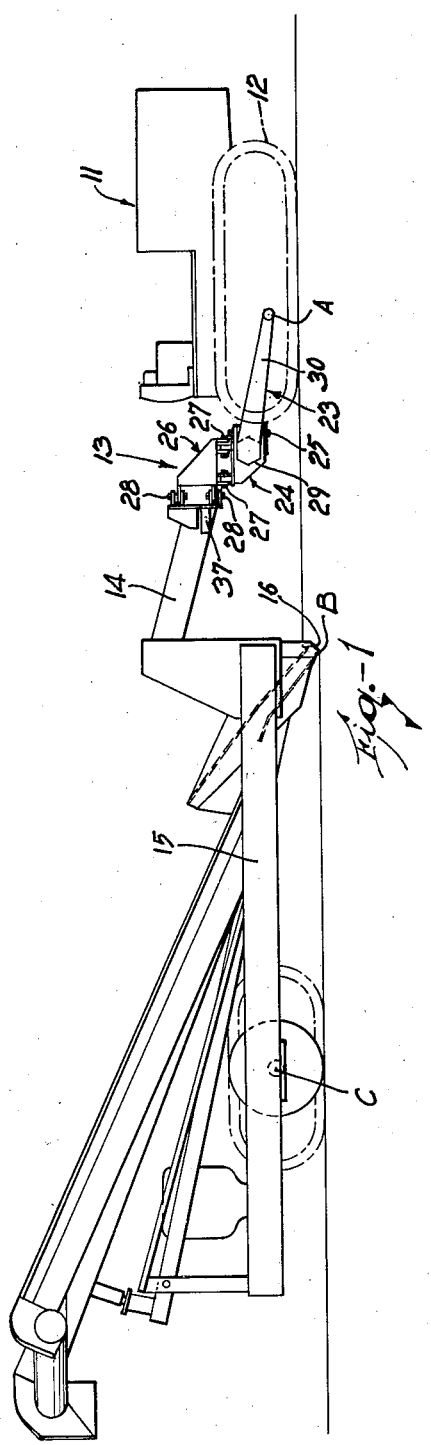
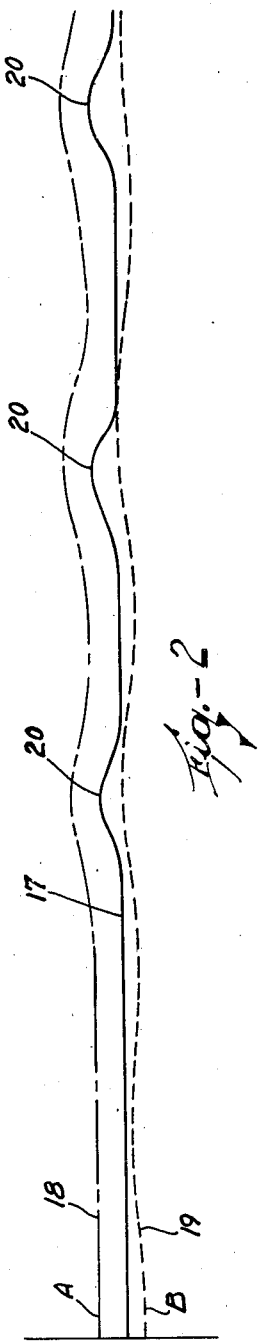
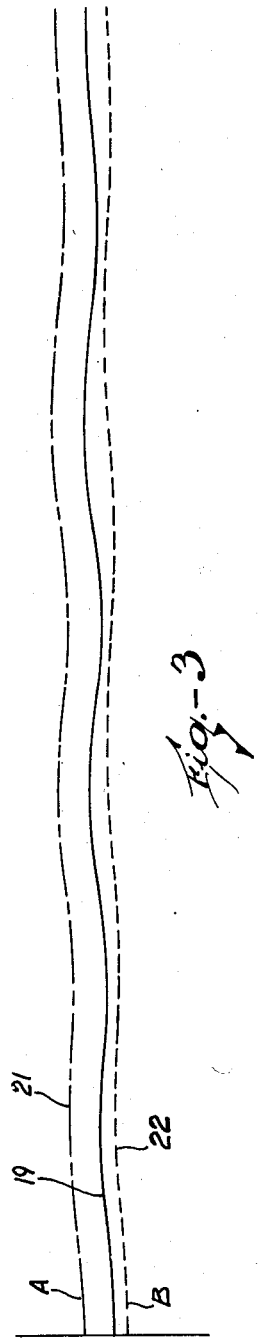
INVENTORS
STANLEY MAYNER
FRANK L. KAPEL
BY Hyde and Meyer
ATTORNEYS

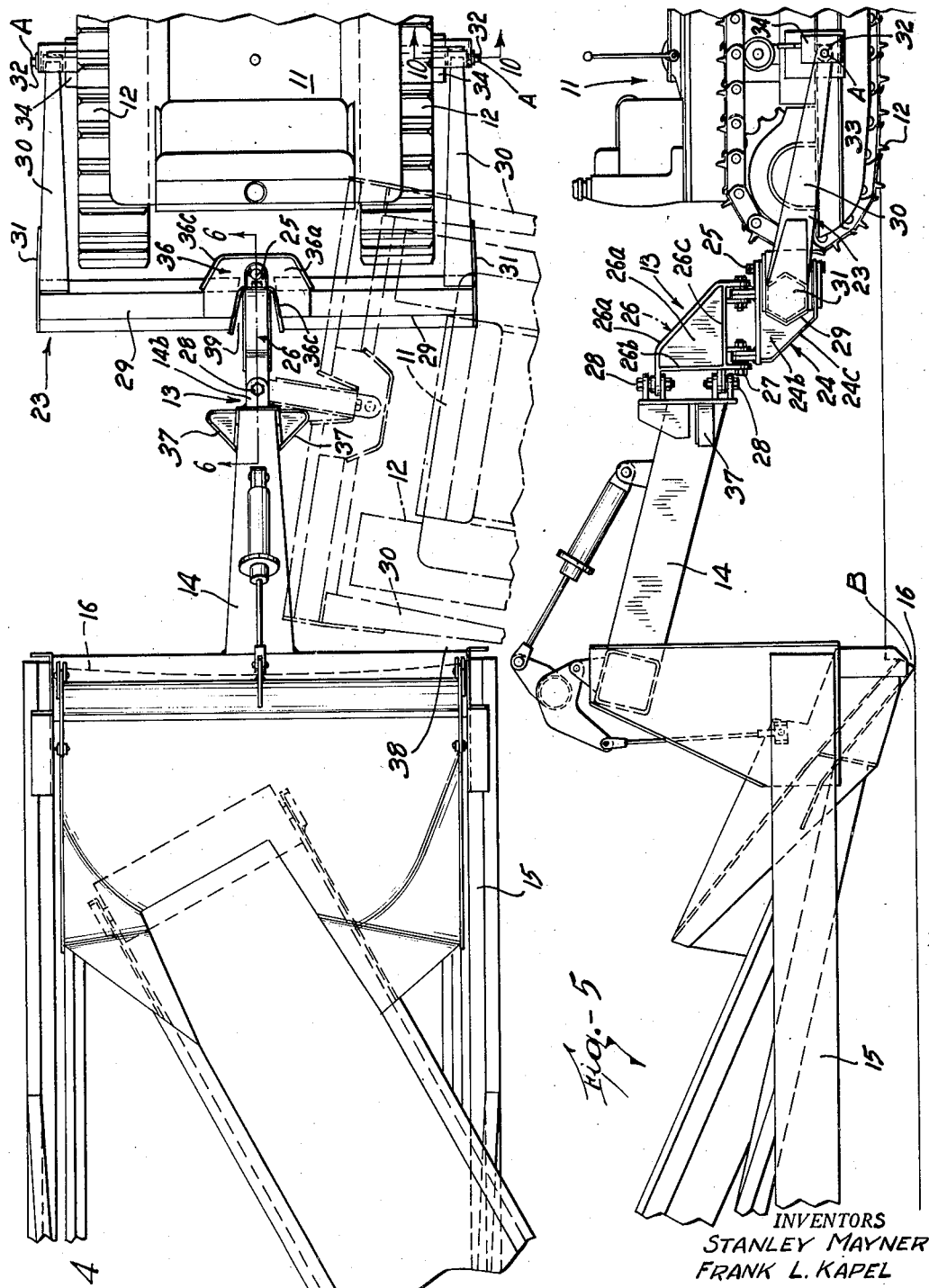

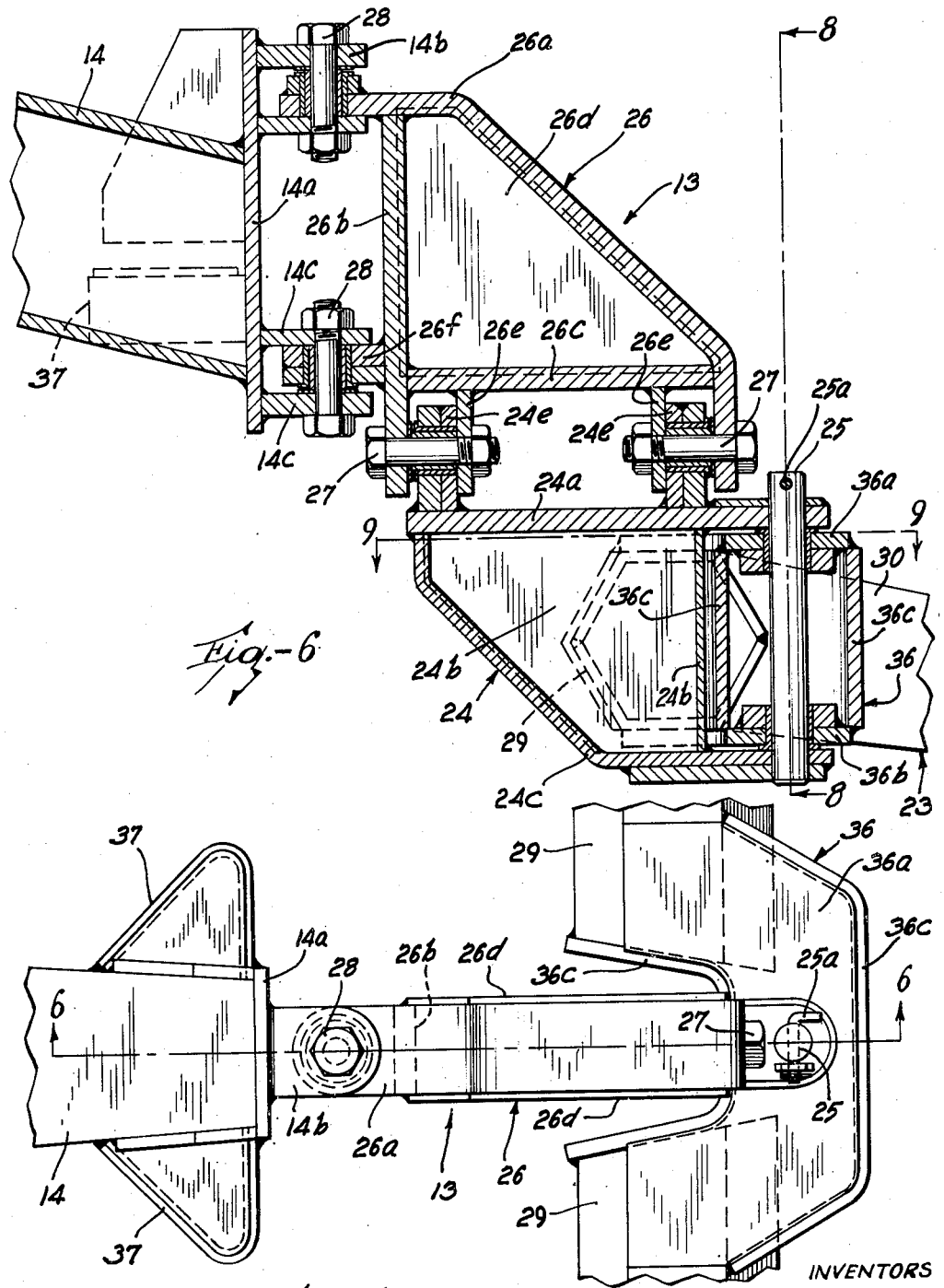

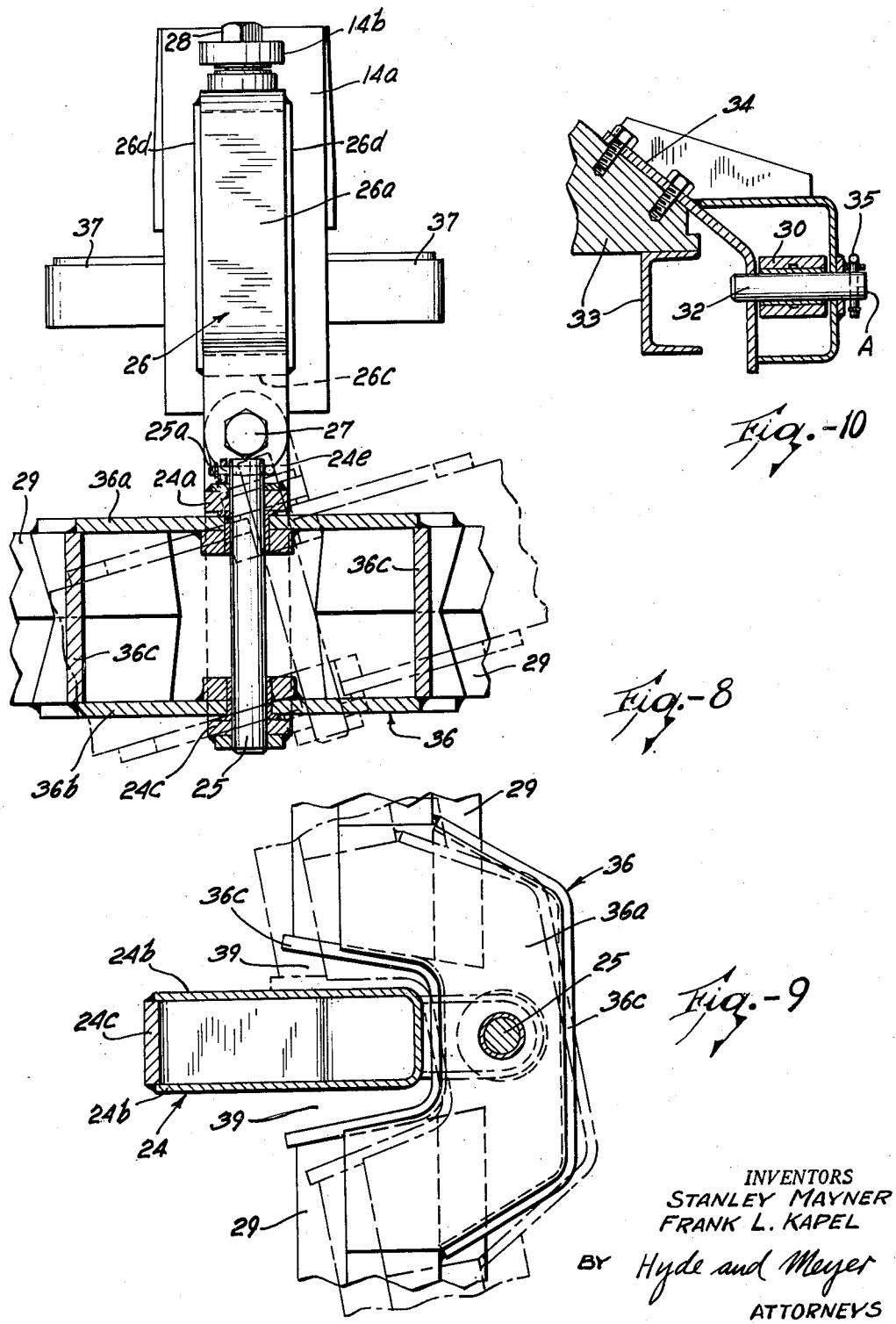

Patented Nov. 22, 1949

2,488,676

UNITED STATES PATENT OFFICE 2,488,676

TRACTOR HITCH

Stanley Mayner, Cleveland Heights, and Frank L. Kapel, Cleveland, Ohio, assignors to The Euclid Road Machinery Company, Euclid, Ohio, a corporation of Ohio Application December 10, 1943, Serial No. 513,702

3 Claims. (Cl. 37—110)

This invention relates to improvements in hitch means utilized between a tractor device propelled by an endless crawler track and a trailer vehicle drawn thereby.

An object of the present invention is to reduce the pitching action transmitted to the trailer vehicle from the tractor device.

Another object of the invention is to carry a portion of the weight of the trailer vehicle on the crawler tracks of the tractor device, to apply this weight near the mid-point of the tractor device, and to utilize this portion of the weight of the trailer vehicle to aid the tractive effort of the tractor.

Another object of the present invention is to provide a hitch of the type described which will permit of relative movement between the tractor device and the trailer vehicle in several planes.

Another object of the invention is to take care of limited side thrust of the trailer vehicle under certain circumstances and the prevention of the application of this side thrust to the tractor device.

Other objects and advantages of our invention include the provision of a very strong construction for the hitch means, novel arrangement of the various pivots, and novel provisions for limiting certain of the pivoting movements occurring within the hitch means, all of which will be apparent from the accompanying drawings and specification and the essential features of our invention will be set forth in the appended claims.

In the drawings Fig. 1 is a side elevational view showing our improved hitch means connecting a tractor device and a trailer vehicle; Figs. 2 and 3 are diagrams illustrating the movement of certain points on the combined vehicles; Fig. 4 is an enlarged plan view of the hitch means of Fig. 1, together with portions of the tractor device and of the trailer vehicle. In dot-dash lines relative turning movement between the two vehicles is illustrated. Fig. 5 is a side elevational view of the mechanism shown in Fig. 4; Fig. 6 is an enlarged sectional view taken along the lines 6—6 of Figs. 4 and 7; Fig. 7 is a top plan view of the parts shown in Fig. 6; Figs. 8 and 9 are sectional views taken along similarly numbered lines of Fig. 6; while Fig. 10 is an enlarged fragmental sectional view taken along the line 10—10 of Fig. 4.

Our invention is shown in connection with a trailer vehicle of the conveyor loader type similar to those shown in Patent No. 2,309,623, granted February 2, 1943, to Raymond Q. Armington, and another loader shown in the copending application of Raymond Q. Armington et al., Serial No. 412,762, filed September 29, 1941 and now Patent No. 2,386,187. However, we do not desire to limit the use of our novel hitch means solely to this type of trailer vehicle except where the language herein used clearly indicates. Therefore, while the accompanying description will be limited solely to discussion of the trailer vehicle shown, it should be understood this is solely for the purpose of brevity and not in any sense by way of limitation.

In prior hitches utilized between tractor devices and trailer vehicles, particularly those of the cart type, it has been customary to hitch the front end of the trailer to the rear end of the tractor device substantially as shown in the above mentioned patent. This results in transmitting to the trailer vehicle a very exaggerated pitching effect in a vertical plane when the tractor goes over rough ground. This has particularly bad effects where the trailer vehicles carries a blade intended to cut into the ground, as is the case with loaders, scrapers, graders and the like. In the operation of this previously used hitch, as shown in the above mentioned patent, as the tractor device goes over uneven ground the hitch raises and lowers, thus causing a raising and lowering of the blade of the trailer vehicle and making an uneven washboard cut. The tractor hitch, being at the extreme rear end of the tractor, has a maximum of motion as the tractor pitches up and down over rough ground, thus making the situation that much worse. When the cutting blade enters a heavy cut the crawler tracks of the tractor device will begin to slip and dig into the ground. There is then a tendency for the front of the tractor to raise slightly while the rear of the tractor tends to bury itself in the ground. This lowers the cutting blade still lower and causes it to gouge into the ground, thus causing a slowing down or stalling of the tractor. The operator then raises the cutting blade in order to make a lighter cut and to allow the vehicles to go forward. Then the tractor pulls out of the hole into which it has dug itself, the front end of the tractor drops down and the rear end of the tractor comes up somewhat, and this raises the blade even farther out of the ground, making either a a light cut or, perhaps, even raising the blade entirely out of the ground and making no cut at all. This leaves a bump in the ground where the blade was pulled out and when the wheels supporting the trailer vehicle go over this bump this produces another undesirable raising and lowering of the blade which results in an additional washboard effect. The large tractor-drawn vehicles using a ground-engaging blade have heretofore used a dolly under the front end of the trailer vehicle in an attempt to produce a smooth cut. This combination of vehicles cannot be backed up as easily as our improved combination using a trailer vehicle of the cart type because a trailer vehicle with a dolly at the front tends to jack-knife when backing. Some bladed trailer vehicles have been used of cart type construction, but in these it has been considered necessary to keep the cutting blade close to the axis of the cartwheels in order to eliminate the up and down movements transmitted from the crawler tractor.

Figs. 2 and 3 illustrate how our improved device smooths a rough ground surface on successive cuts. Referring first to the general combination shown in Fig. 1, a tractor device 11 propelled by endless crawler tracks 12 is connected by our improved hitch means, indicated generally at 13, with the drawbar 14 of the trailer vehicle 15. This vehicle carries a cutting blade 16 at the point marked B. Toward the rear central portion of the vehicle 15 is provided means alined substantially upon a single axis for supporting the vehicle for travel on the ground. For the purposes of the present application, we intend the above phrase to cover either wheels alone or short endless tracks alone, or a combination of the two substantially alined on a single axis indicated at C so that the effect produced is the pivoting of the trailer vehicle substantially about the axis of the wheel or supporting means, and a large portion of the weight of the trailer vehicle overhangs at the front end of the trailer vehicle and a portion of this overhanging weight is carried forward to the tractor device, as will be presently explained. The hitch means 13 is pivotally connected to the tractor at alined points A, which is near the center of the tractor device and is as near the mid-point between the front and rear ends of the endless track 12 as is practicable.

This combination of Fig. 1 is assumed to pass over ground having the contour indicated by the solid line 17 in Fig. 2. The point A will then follow the dot-dash line marked 18 in Fig. 2 and the blade B will follow the broken line 19. It is assumed for the purpose of this diagram that the ground 17 is level both to the right and left of the portions shown. It will be seen that line 19 represents a considerable smoothing of the bumps 20 which occurred in the original ground. For purposes of showing the effect of a second cut the line 19 has been carried to Fig. 3 as a solid line indicating the ground level for the second cut. The point A on this second cut will follow the dot-dash line 21 of Fig. 3 and the blade B will cut along the broken line 22 of Fig. 3. This line 22 shows a still further smoothing or levelling of the ground and in a few cuts using our improved equipment a fairly rough surface is levelled.

The cause of the above described levelling action is the placing of the hitch connections at A at a mid-point of the tractor device and particularly of the crawler tracks thereof, so that as the tractor pitches when going over rough ground the point A partakes of a minimum amount of pitching. At the same time there is a long lever arm between the points A and C so that what movement does occur at the point A is transmitted in only a slight amount to the trailer vehicle. It will be noted that the point B where the blade enters the ground is substantially half way between the points A and C and therefore only about half of the vertical movement of the point A will be produced at the point B.

Our improved hitch means by which we accomplish the above described desirable results comprises a yoke 23 pivotally connected to the tractor at points A, a bracket 24 pivotally connected to the yoke at pin 25 and a bracket 26 pivotally connected to bracket 24 by horizontally alined pivots 27 and in turn pivotally connected to drawbar 14 by vertically alined pivots 28. This construction will now be explained more in detail. The yoke 23 is generally of U-shape having a rear crossbar 29 of hollow hexagonal beam form composed of plates rigidly welded together. The yoke has two substantially parallel side arms 30 rigidly connected at the ends of the rear crossbar as by welding and reinforced thereby plates 31. The forward ends of the side arms are pivotally connected at points A to the tractor frame by horizontally positioned pivot pins 32 best seen in Fig. 10. Here the tractor frame is shown at 33 and to this is bolted a reinforced bracket 34 which provides bearing means for the pin 32 the parts being held in position by an L-shaped pin 35. It will be noted that the position of this connecting point A is nearer the center of the endless tracks 12 than either end thereof.

The bracket 24 is connected to yoke 29 along the center line of the tractor device. In some cases no pivotal connection such as that shown at pivot 25 will be necessary, but in the present instance, for a special purpose, this pivot is provided. To this end and so as to place the pin 25 as close to the tractor as possible, an off-set bracket 36 is provided rigid with the hexagonal beam 29 and consisting of a top plate 36a, a bottom plate 36b and front and rear vertically disposed U-shaped plates 36c. All of these are welded together to provide a hollow beam construction for the support of pin 25, as is clearly shown in Figs. 6 and 7. Suitable bearings and reinforcing plates to support the same are provided for the pin 25 as clearly shown in Fig. 6.

The bracket 24 comprises a top plate 24a, a front vertically positioned plate 24b and a combined bottom and rear plate 24c, and the front plate 24b is bent in U shape to provide plates closing the sides of the bracket, which results in a hollow and very strong construction. The plates 24a and 24c have forwardly extending ears provided with openings aligned with similar openings in the bracket 36 for reception of the pin 25. A bent securing pin 25a holds the pin 25 in place. Ears 24e properly reinforced and rigidly secured to plate 24a as by welding extend vertically upward from bracket 24 and are provided with openings for receiving the pivot bolts 27, as will presently appear.

The bracket 26 comprises a combined top and front plate 26a, a rear plate 26b and a bottom plate 26c, together with parallel side plates 26d all welded together to provide a very strong hollow construction.

Parallel downwardly extending ears 26e are rigidly secured to plate 26c and portions of plates 26a and 26b extend downwardly parallel to the ears 26e to give a double clevis support with suitable openings alined with those in the ears 24e to receive the pivot bolts 27.

Vertical pivot means is provided between bracket 26 and the trailer vehicle drawbar 14. To this end, plate 14a, rigidly secured to the front end of the drawbar, is provided with parallel ears 14b at the top and parallel ears 14c at the bottom, which are alined with ears 26f and the rear end of plate 26a to provide a double clevis arrangement, all having suitable alined openings to receive the vertically disposed pivot bolts 28.

It results from the above described construction that the pair of vertically alined pivot bolts 28 lying in the same plane with the pair of horizontally disposed pivot bolts 27 connect the drawbar 14 with bracket 24 in a manner to prevent any bending in a vertical plane, and since the bracket 24 is connected with yoke 23 in a manner to prevent relative movement between them in a vertical plane, the net result is that the weight of the trailer vehicle is transmitted through our improved hitch means to the yoke 23 and carried forward to the points of application A on the tractor device. At the same time the vertical pivot provided at 28 permits relative turning movement between the tractor and the trailer slightly beyond 90° as illustrated in the dot-dash view of Fig. 4. Preferably, limiting means for this movement is provided by means of the angle-shaped brackets 37 rigidly connected to the nose of the drawbar 14. These are clearly shown in Figs. 4 and 7.

Relative oscillation between the tractor and trailer vehicles about the horizontal pivot means 27 is represented in Fig. 8 between the full line and dot-dash positions of the parts there shown.

The purpose of the vertical pivot 25 is to take care of a condition which often arises when a device such as the conveyor loader shown at 15 is making a cut into a bank where the blade 16 is cutting mostly at one side of the trailer vehicle. This causes a side thrust on the hitch means which would be transmitted to the tractor device unless the pivot 25 were provided. For instance, if in Fig. 4 the blade of the conveyor loader is cutting most deeply at the point 38, then the side thrust will tend to move the hitch means in the opposite direction, or to close the gap 39 shown in Fig. 4 between bracket 24 and the rear plate 36c of the bracket 36. This relative movement of the parts is illustrated in Fig. 9. Relatively slight clearance is provided at the points 39 between the brackets 24 and 36. This is sufficient to take care of the side thrust which normally develops but, because it is of small amount, it does not interfere with the ability to back up the trailer vehicle whenever desired, without jack-knifing.

It results from our improved construction that a great portion of the load of the front end of the trailer vehicle is transmitted to approximately the mid-point of the tractor device, which is the most desirable point for carrying a load, and this additional weight at that point greatly aids the tractive effort of the tractor device 11. At the same time, all necessary relative movements between the vehicles 11 and 15 are provided for in the hitch means, and the parts are sufficiently strong to handle a trailer vehicle weighing several tons.

What we claim is:

1. In the combination of a tractor device and a drawn trailer vehicle of the type supported for movement along the ground by wheel means alined substantially upon a single axis, means providing the sole support for the front end of said vehicle and comprising a U-shaped yoke positioned generally horizontally and having a rear crossbar back of said tractor device and having parallel arms extending forwardly therefrom, horizontally disposed pivot means connecting the forward ends of said arms to said device intermediate the front and rear ends thereof, said yoke having a central portion recessed toward said device, a first bracket, vertically disposed pivot means connecting said bracket and said central yoke portion, said yoke providing means limiting movement of said bracket about said pivot means, a second bracket, spaced alined horizontally disposed pivots connecting said brackets, a drawbar rigid with said trailer vehicle, and spaced alined vertical pivots connecting said second bracket with said drawbar.

2. In the combination of a tractor device and a drawn trailer vehicle of the type supported for movement along the ground by wheel means aligning substantially upon a single axis, means providing the sole support for the front end of said vehicle and comprising a U-shaped yoke positioned generally horizontally and having a rear crossbar back of said tractor device and having parallel arms extending forwardly therefrom, horizontally disposed pivot means connecting the forward ends of said arms to said device intermediate the front and rear ends thereof, said yoke having a central portion recessed towards said device, a first bracket, vertically disposed pivot means connecting said bracket and said central yoke portion, the sides of said recessed portion providing means limiting movement of said bracket about said pivot means, a second bracket, horizontally disposed pivot means connecting said brackets, a drawbar rigid with said trailer vehicle, and vertically disposed pivot means connecting said second bracket with said drawbar.

3. The combination of a tractor adapted to travel on the ground, a trailer cutting device adapted to dig into ground at a higher level than, and to one side of, the ground traversed by said tractor, and a hitch connecting said tractor and trailer, said hitch comprising a U-shaped yoke positioned generally horizontally and having a crossbar in rear of said tractor and having arms extending forwardly therefrom, horizontally disposed pivot means connecting the forward ends of said arms to said tractor intermediate the front and rear ends thereof, a first bracket, vertically disposed pivot means connecting said bracket to said yoke crossbar, a second bracket, horizontally disposed pivot means connecting said brackets, a drawbar rigid with said trailer and vertical pivot means connecting said second bracket with said drawbar, whereby said trailer may swing and remain laterally out of line with said tractor and, while there, have universal motion relative to said tractor including motion about two horizontal pivots and one vertical pivot.

STANLEY MAYNER.
FRANK L. KAPEL.

REFERENCES CITED

The following references are of record in the file of this patent:

UNITED STATES PATENTS

| Number | Name | Date |
| --- | --- | --- |
| 1,377,609 | Townsend | May 10, 1921 |
| 1,397,053 | Mitchell | Nov. 15, 1921 |
| 1,471,887 | Dorney et al. | Oct. 23, 1923 |
| 1,837,753 | Berry | Dec. 22, 1931 |
| 1,990,731 | Greer | Feb. 12, 1935 |
| 2,090,891 | Kuns | Aug. 24, 1937 |
| 2,091,009 | Osman | Aug. 24, 1937 |
| 2,187,970 | Greer | Jan. 23, 1940 |

FOREIGN PATENTS

| Number | Country | Date |
| --- | --- | --- |
| 264,171 | Great Britain | Feb. 9, 1928 |